United States Patent
French et al.

(10) Patent No.: US 6,932,372 B2
(45) Date of Patent: Aug. 23, 2005

(54) DETACHABLE GOOSENECK TRAILER HITCH

(75) Inventors: Peter John French, South Australia (AU); Michael David Nunn, South Australia (AU)

(73) Assignee: Birrana Engineering Pty Ltd, South Australia (AU)

( * ) Notice: Subject to any disclaimer, the term of this patent is extended or adjusted under 35 U.S.C. 154(b) by 0 days.

(21) Appl. No.: 10/234,527

(22) Filed: Sep. 3, 2002

(65) Prior Publication Data

US 2003/0042705 A1 Mar. 6, 2003

(51) Int. Cl.[7] ............................................. B62D 53/06
(52) U.S. Cl. ............................. 280/417.1; 280/425.2; 280/441.2
(58) Field of Search .......................... 280/417.1, 423.1, 280/425.2, 441.2, 901; 414/481

(56) References Cited

U.S. PATENT DOCUMENTS

| | | | | |
|---|---|---|---|---|
| 2,967,720 A | * | 1/1961 | Smith et al. | 280/441.2 |
| 3,215,449 A | * | 11/1965 | Talbert | 280/441.2 |
| 3,517,945 A | * | 6/1970 | Fiske | 280/441.2 |
| 3,866,947 A | | 2/1975 | Yakubow | |
| 4,367,884 A | * | 1/1983 | Johnson et al. | 280/441.2 |
| 4,413,836 A | * | 11/1983 | Losh | 280/441.2 |
| 4,423,885 A | | 1/1984 | Camey et al. | |
| 4,472,100 A | * | 9/1984 | Wagner | 414/481 |
| 4,513,987 A | * | 4/1985 | Whitaker | 280/441.2 |
| 5,415,425 A | * | 5/1995 | Zerbe et al. | 280/441.2 |
| 5,435,586 A | | 7/1995 | Smith | |
| 6,224,082 B1 | | 5/2001 | Landoll et al. | |
| 2001/0024027 A1 | * | 9/2001 | Landoll et al. | 280/477 |

FOREIGN PATENT DOCUMENTS

| | | |
|---|---|---|
| AU | A-32963/95 | 11/1995 |
| CA | 1051938 | 3/1979 |

* cited by examiner

*Primary Examiner*—Anne Marie Boehler
(74) *Attorney, Agent, or Firm*—The Webb Law Firm (57) ABSTRACT

A hitch assembly for connecting a front end 21 of a low-loader trailer to a tow vehicle 10 is disclosed. The hitch assembly includes: a first mount 22 located at the front end 21 of the trailer; a second mount 25 longitudinally spaced towards the rear end of the trailer from the first mount 21; a gooseneck frame 40 having a front end and a rear end, the front end connectable to the tow vehicle 10; a latch connectable 50 to the front end 21 of the trailer by engagement with the first and second mounts 22 and 25, the latch 50 pivotally connected to the rear end of the gooseneck frame 40; and a means for rotating the latch 50 with respect to the gooseneck frame 40. The assembly is such that in use, the front end of the trailer 21 is liftable by the action of a force couple imparted entirely through the latch 50 to the first and second mounts 22 and 25. The pivotal connection between the latch and the gooseneck frame is positioned on the gooseneck such that, in use, rotation of the latch 50 to lift the front end 21 of the trailer, moves the trailer forwards with respect to the rear end of the gooseneck.

20 Claims, 10 Drawing Sheets

DETACHABLE GOOSENECK TRAILER HITCH

FIELD OF THE INVENTION

The present invention relates to heavy duty industrial trailers and in particular to large front loading flat bed trailers.

BACKGROUND OF INVENTION

Transporting very large equipment such as earthmoving equipment used on mine sites, particularly large tracked vehicles, require specially designed large flat bed trailers. Conventional large rear-loading trailers have a large number of wheels at their rear ends. Because of the large number of wheels, their diameter can be relatively small to facilitate loading. However, the lip of the loading deck is still usually high enough off the ground to make loading of some large vehicles difficult. Large front loading trailers are also known. These trailers typically have wheels located at their rear ends and liftable front ends. The liftable front ends are designed to be lowered to engage the ground so as to present a minimal step or ramp up on to the trailer bed for loading.

Special hitch arrangements, referred to as gooseneck hitches have been developed to allow lifting and lowering of such trailer ends. These hitches are designed so that the gooseneck can be removed from the trailer leaving the front end clear for loading.

It is known to use goosenecks having hydraulic rams arranged through linkages to provide a force couple to the end of a trailer to cause relative rotation of the platform and gooseneck. This relative rotation raises/lowers the trailer end. Existing hitch assemblies have a number of problems. For instance with the existing hitch assemblies, goosenecks typically have a hook which engages a pin laterally disposed with respect to the front end of the trailer. As the trailer end is raised there is rotational movement between these two components. The friction associated with this rotational movement reduces the efficiency of the lifting process and causes wear.

A further problem with existing hitch arrangements is that as the trailer end is raised, the trailer is pushed away from the tow vehicle. If brakes are applied to the wheels of both the tow vehicle and the trailer, this horizontal movement can cause significant stresses in the hitch assembly and trailer.

Other problems with the existing hitch assemblies include locking of the hitch in a raised position for transport. With some existing designs it is necessary to insert compression blocks to take the load off lifting joints and components before transport can occur. With other designs there are no locking mechanisms at all and a leakage or bypass in the hydraulic cylinder or valves can cause the trailer to drop.

A further problem with many existing designs is that the placement of the hydraulic cylinders is such that it is difficult to maintain them.

Another problem with some existing designs is that separate mechanisms are required to transmit forces caused by braking and/or traction.

Finally with many hitch arrangements it is difficult to align the gooseneck with the trailer end.

It is an object of the invention to overcome at least some of the above problems.

SUMMARY OF THE INVENTION

According to a first aspect of the invention of the invention there is provided a hitch assembly for connecting a front end of a low-loader trailer to a tow vehicle, the hitch assembly comprising:

a first mount located at the front end of the trailer;

a second mount longitudinally spaced towards the rear end of the trailer from the first mount;

a gooseneck frame having a front end and a rear end, the front end connectable to the tow vehicle;

a latch connectable to the front end of the trailer by engagement with the first and second mounts, the latch pivotally connected to the rear end of the gooseneck frame and having a longitudinally extending body having a front end and a rear end; and a means for rotating the latch with respect to the gooseneck frame, wherein, in use, the front end of the trailer is liftable by the action of a force couple imparted entirely through the latch to the first and second mounts.

Preferably the pivotal connection between the latch and the gooseneck frame is positioned on the gooseneck such that, in use, rotation of the latch to lift the front end of the trailer, moves the trailer forwards with respect to the rear end of the gooseneck. This movement of the trailer forwards with respect to the rear end of the gooseneck offsets (fully or partially) the movement of the rear end of the gooseneck rearwards with respect to the towing vehicle caused by rotation of the gooseneck about its elevated pivot axis at its connection point with the towing vehicle as the front end of the trailer is raised.

Preferably the pivotal connection between the latch and the gooseneck frame is at the front end of the latch body.

Preferably the means for rotating the latch with respect to the gooseneck frame comprises:

a ram means having a proximal and a distal end, the ends movable with respect to each other and the proximal end mounted to the front end of the gooseneck frame;

a lever rotatably connected at a fulcrum to the gooseneck frame, the lever having proximal and distal ends, the proximal end pivotally connected to the distal end of the ram means; and a link arm having a proximal and a distal end, the proximal end pivotally connected to the distal end of the lever and the distal end of the link arm pivotally connected to the rear end of the latch body.

Preferably, in use, the ratio of linear movement between the proximal and distal ends of the ram means to the angular movement between the latch and the gooseneck frame decreases between the initial extension of the ram means and the final extension of the ram means. With a particular embodiment of the invention, the result of this is, translation of an initial short portion of the ram mean's extension into a large angular movement of the latch followed by the translation of the a large proportion of the ram means' extension into a high torque rotation of the latch. This enables a relatively small diameter hydraulic cylinder to be used as the ram means.

Preferably the lever fulcrum, the pivotal connection between the link arm and the lever and the pivotal connection between the link arm and the latch are substantially in line when the front of the trailer is fully lifted by the latch.

Preferably the latch comprises:

a rearwardly opening mouth engagable with an underside of the first mount; and a downwardly facing engagement means, disposed rearwardly from the mouth, engagable with an upperside of the second mount.

Preferably the latch further comprises a ramped surface extending rearwards and downwards from the downwardly facing engagement means, wherein, upon initial rotation of the latch, the ramped surface slides with respect to the second mount so as to pull the latch into locking engagement with both the first and second mounts.

Preferably the first mount comprises a first pin, or a first pair of coaxially aligned pins, mounted transversely to the front end of the trailer and preferably the second mount comprises a second pin, or a second pair of coaxially aligned pins, mounted transversely to the front end of the trailer.

According to a second aspect of the invention there is provided a gooseneck assembly for connecting a front end of a low-loader trailer to a tow vehicle, the gooseneck assembly comprising:

a gooseneck frame having a front end and a rear end, the front end connectable to the tow vehicle;

a latch pivotally connected to the rear end of the gooseneck frame for rotation about an axis transverse to the gooseneck frame, the latch connectable to the front end of the trailer by engagement at two longitudinally spaced apart locations on the trailer; and a means for rotating the latch with respect to the gooseneck frame, wherein, when connected to the trailer, rotation of the latch with respect to the gooseneck frame lifts the front end of the trailer by the action of a force couple imparted entirely through the latch.

Preferably the pivotal connection between the latch and the gooseneck frame is positioned on the gooseneck such that, in use, rotation of the latch to lift the front end of the trailer, moves the trailer forwards with respect to the rear end of the gooseneck.

BRIEF DESCRIPTION OF THE DRAWINGS

A preferred embodiment of the invention is illustrated in the accompanying representations in which.

DETAILED DESCRIPTION OF THE PREFERRED EMBODIMENTS

Figure 1:
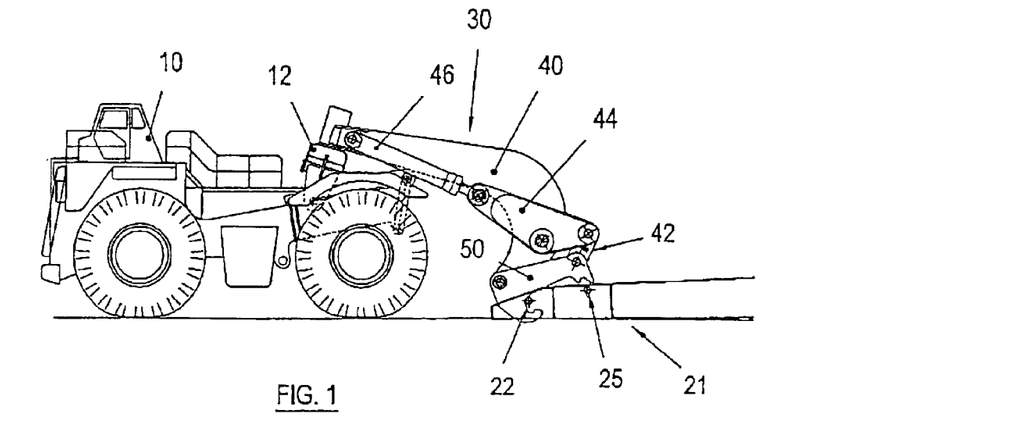
FIGS. 1 and 2 show a tow vehicle, a hitch assembly according to the invention and the front end of a low loader trailer in a lowered position and a raised position respectively.
Figure 2:
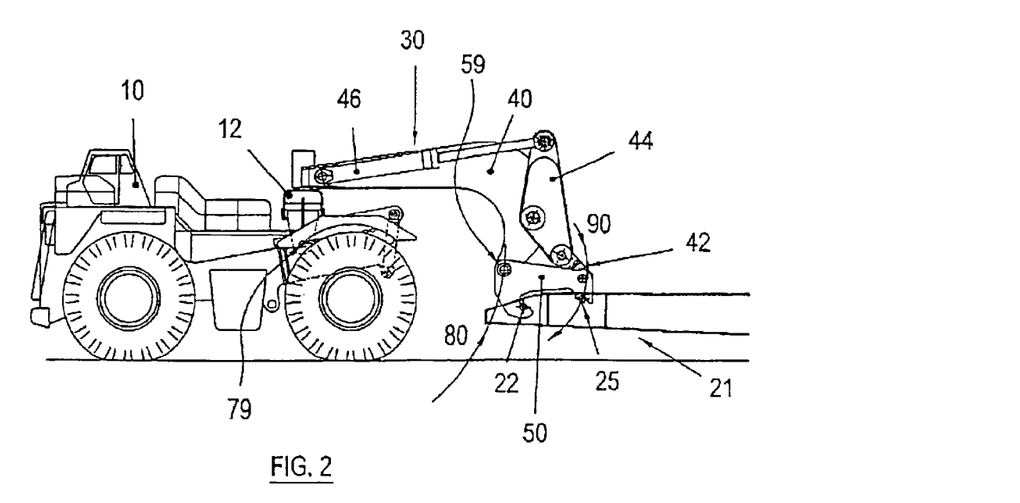
Figure 11:
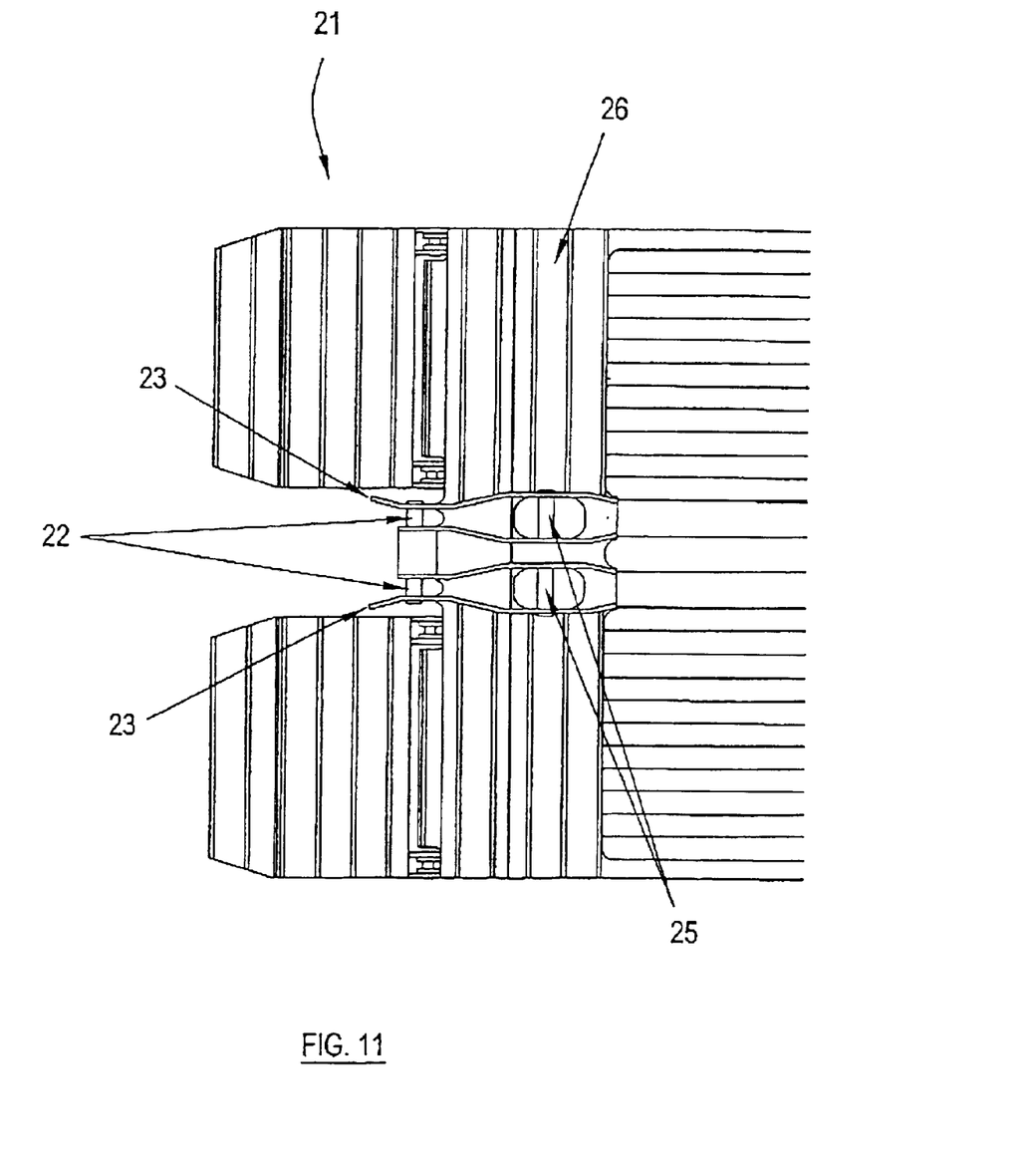
FIG. 11 shows a plan view of the front cross member area of the trailer of FIGS. 5 to 9.

Referring to FIGS. 1 and 2, a hitch assembly 30 for lifting and towing a low loader trailer 20 (shown dearly in FIG. 5), is shown mounted to a tow vehicle 10. The hitch assembly 30 includes a gooseneck assembly 35 that connects to the front and 21 of the trailer 20 at first and second mounts 22 and 25. While various mounting arrangements can be used, with this embodiment if the invention the first and second mounts comprise a pair of co-axially aligned pins (22 and 25 respectively) mounted transversely to the front end of the trailer 21 as shown in FIG. 11.

Figure 3:
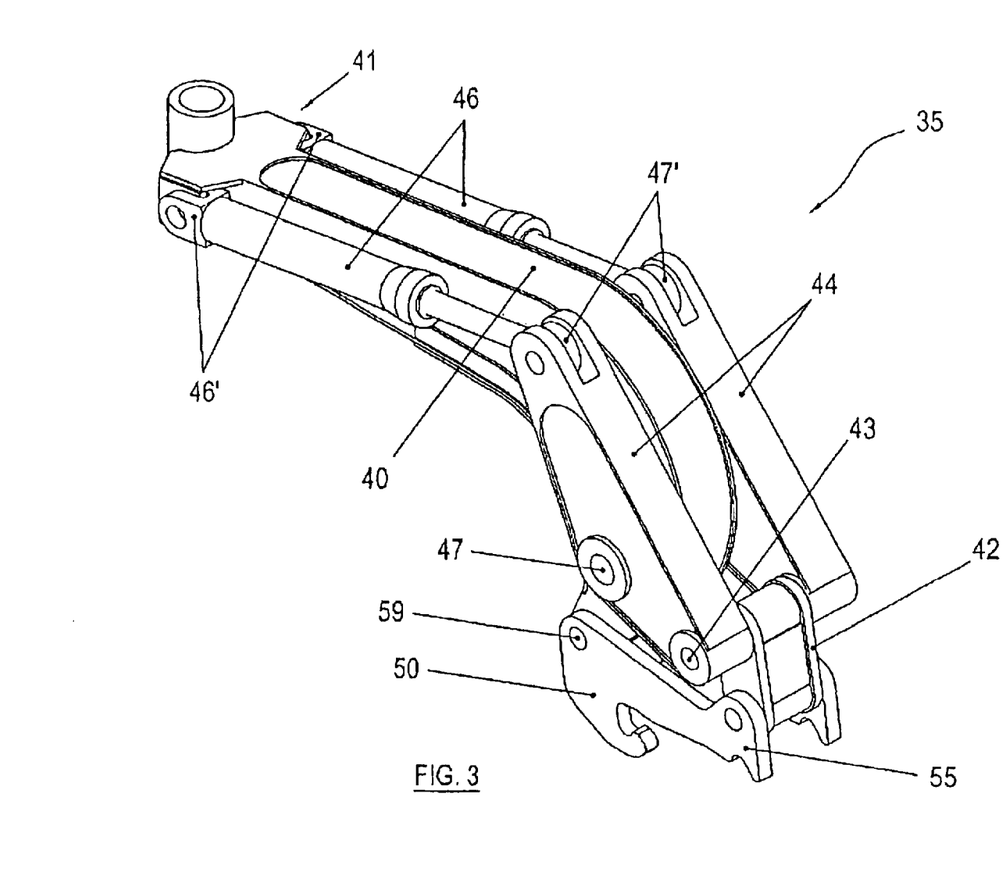
FIGS. 3 and 4 show perspective views from above and below respectively of a part of the hitch assembly of FIGS. 1 and 2.
Figure 4:
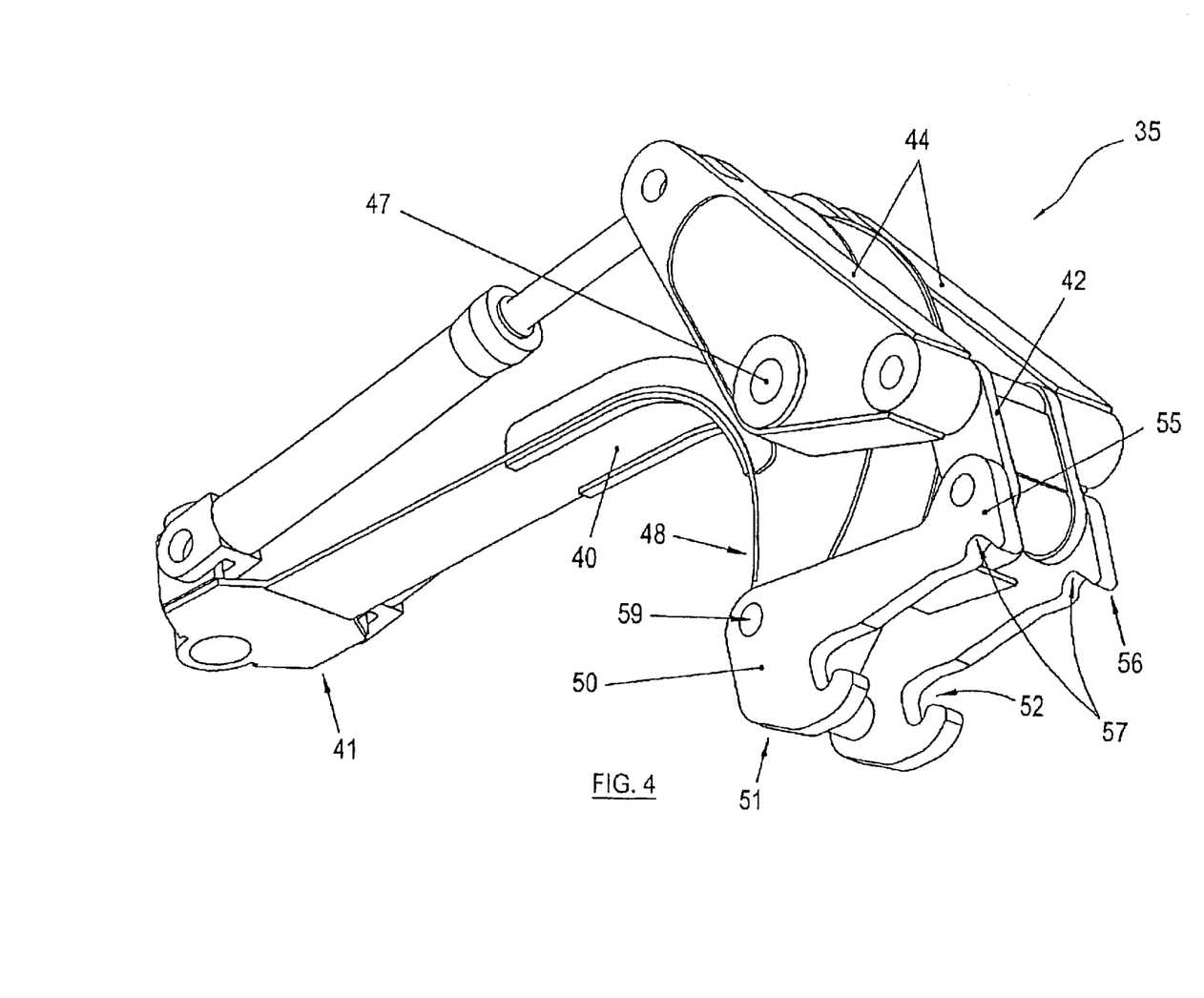
Figure 4A:
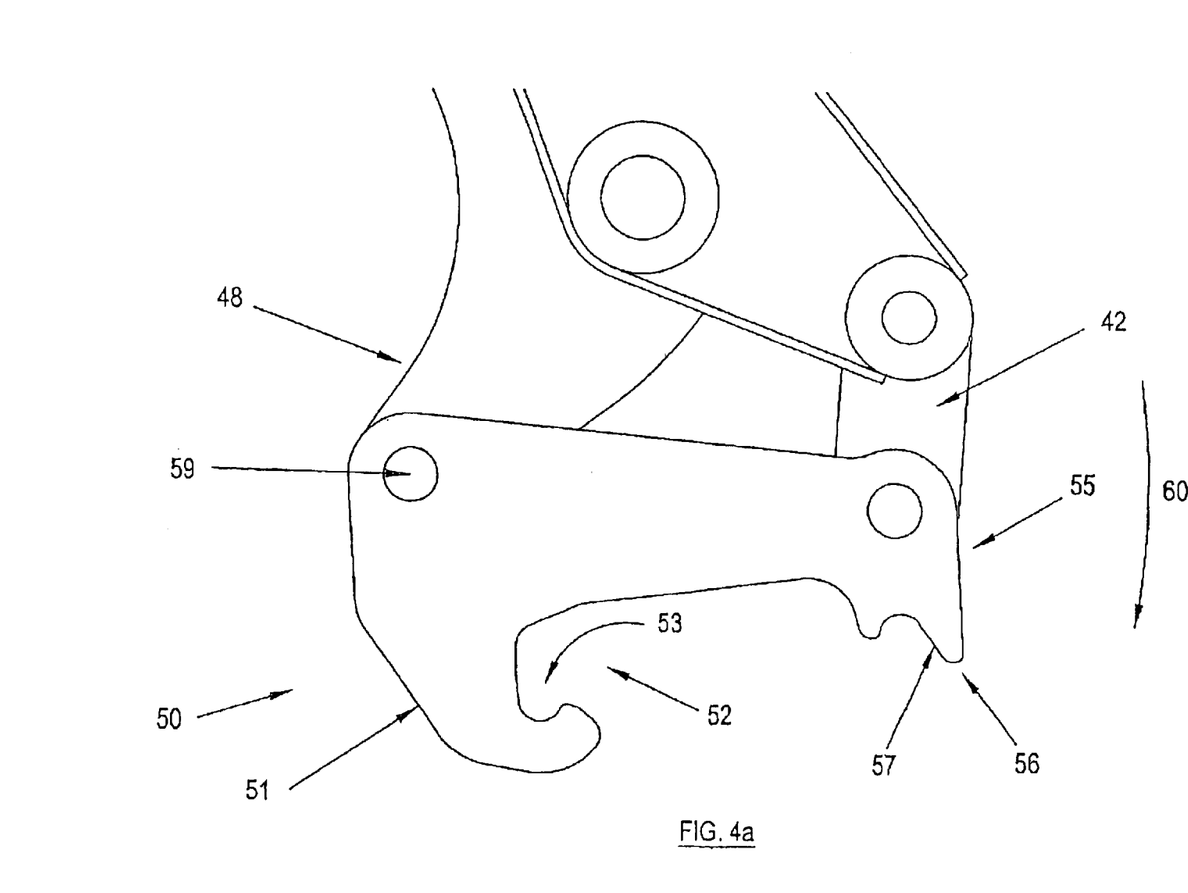
FIG. 4a shows a detailed side view of the latch connected to the rear end of the gooseneck shown in FIGS. 3 and 4.

Latch 50 comprises a pair of parallel laterally spaced apart side members in the form of plates jointed together for movement in unison (shown most clearly in FIGS. 3 and 4). FIGS. 3, 4 and 4a show the gooseneck assembly 35 more clearly. Referring to these figures, it can be seen that the gooseneck assembly comprises a gooseneck frame 40 having a front end 41 and a rear end 48, a latch 50 pivotally connected to the rear end 48 of the gooseneck frame and a means for rotating the latch 50 with respect to the gooseneck frame 40.

While in this embodiment of the invention the side member comprise plate, in other embodiments the side member may be shaped for optimum structural efficiency and minimal weight and therefor may not be plate-like. Furthermore, the side members need not necessarily be joined to each other.

Rotation of the latch 50 with respect to the gooseneck frame 40 lifts the front end 21 of the trailer by the action of a force couple imparted entirely through the latch 50. There is no relative movement between the latch 50 and the front end 21 of the trailer during lifting of the front end of the trailer 21.

The pivotal connection 59 between the rear end 48 of the gooseneck frame 40 and the latch 50 is positioned such that rotation of the latch 50 to lift the front end 21 of the trailer also moves the trailer forwards with respect to the rear end 48 of the gooseneck 40. (This movement is illustrated by arrow 90 on FIG. 2).

The movement of the trailer forwards with respect to the rear end of the gooseneck 48 off sets (at least partially) the movement of the rear end 48 of the gooseneck 40 rearwards with respect to the towing vehicle 10 caused by rotation of the gooseneck body about its elevated pivot axis at its king pin connection point 79 on the towing vehicle as the front end 21 of the trailer is raised (this movement is illustrated by arrow 80 on FIG. 2).

In other embodiments of the invention, the positioning of the pivotall connection 59 and the general geometry of the latch 50 can be arranged such that the above described movement can be fully off set.

FIGS. 3, 4 and 4a show the gooseneck assembly more clearly. Referring to these Figures, it can be seen that the latch 50 comprises a longitudinally extending body having a front end 51 and rear end 55. Front end 51 is pivotally connected to the rear end 48 of the gooseneck 40. A ram means in a form of a pair of hydraulic cylinders 46 is mounted to the front end 41 of the gooseneck 40. The piston rod ends 47' of the hydraulic cylinders 46 are pivotally connected to a pair of levers 44 which are mounted to the gooseneck 40 at a fulcrum 47. Connecting the lower ends of the levers 44 is a shaft through a proximal end of a link arm 42. The distal end of link arm 42 is pivotally connected to the rear end 55 of latch 50.

Figure 10:
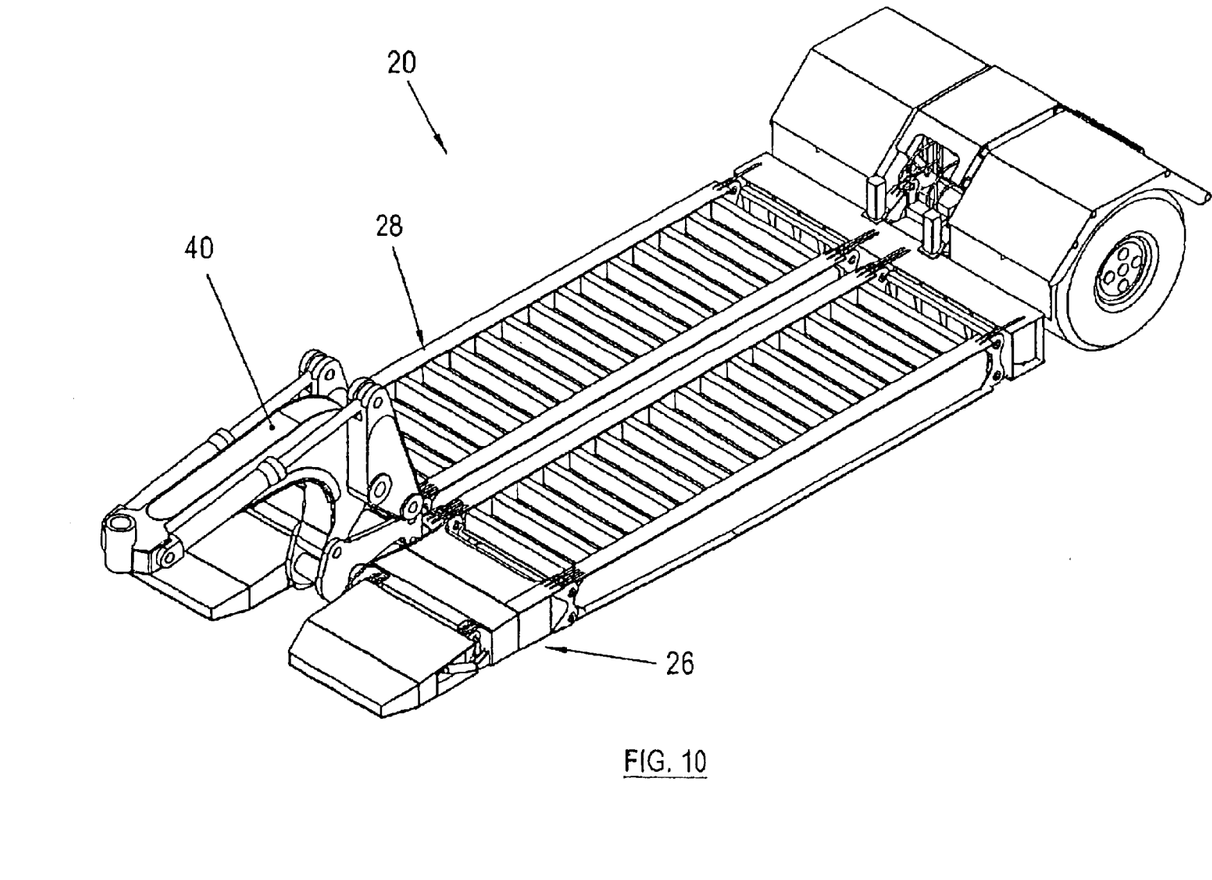
FIG. 10 is a top perspective view of the hitch assembly of FIGS. 1 & 2 in use with a modular low loader trailer.

FIGS. 10 and 11 illustrate the positions of the first and second pairs of coupling pins 22 and 25 more clearly. Referring FIG. 11, which shows the front portion of the trailer 20 in plan view, it can be seen that the first pair of coupling pins 22 are located at the front of the trailer between lead-in guides 23. These lead-in guides 23 assist the operator of tow vehicle 10 in positioning the latch 50 around the front pins 23. The second pair of coupling pins 25, longitudinally spaced towards the rear end of the trailer from the first pair of coupling pins 22 are recessed under the top surface of the deck 28. Oversized openings are provided around pins 25 to allow for some initial misalignment between the gooseneck 40 and the front end 21 of the low loader trailer 20 during the initial stages of hitching.

Returning to FIGS. 3 and 4, it can be seen that the latch 50 is shaped to engage the underside of the first pair of coupling pins 23 and the top side of the second pair of coupling pins 25. Latch 50 has a generally open mouth 52 that is split to be engageable under each first coupling of the pins 23. At the rear end 55 of the latch 50 is a split finger 56 that extends rearwards from the mouth 52 over the second pins 25. The finger 56 presents a ramped surface 57 (as shown in FIG. 4a) to the second coupling pins 25. Initial rotation of the latch 50, in the direction indicated by arrow 60, causes the ramped surface 57 to slide with respect to the second coupling pins 25 so as to pull the latch 50 in to locking engagement with both the first and second pins 22 and 25. The finger 56 and its ramped surface 57 will also assist in aligning the gooseneck body 40 with the trailer 20.

Figure 11A:
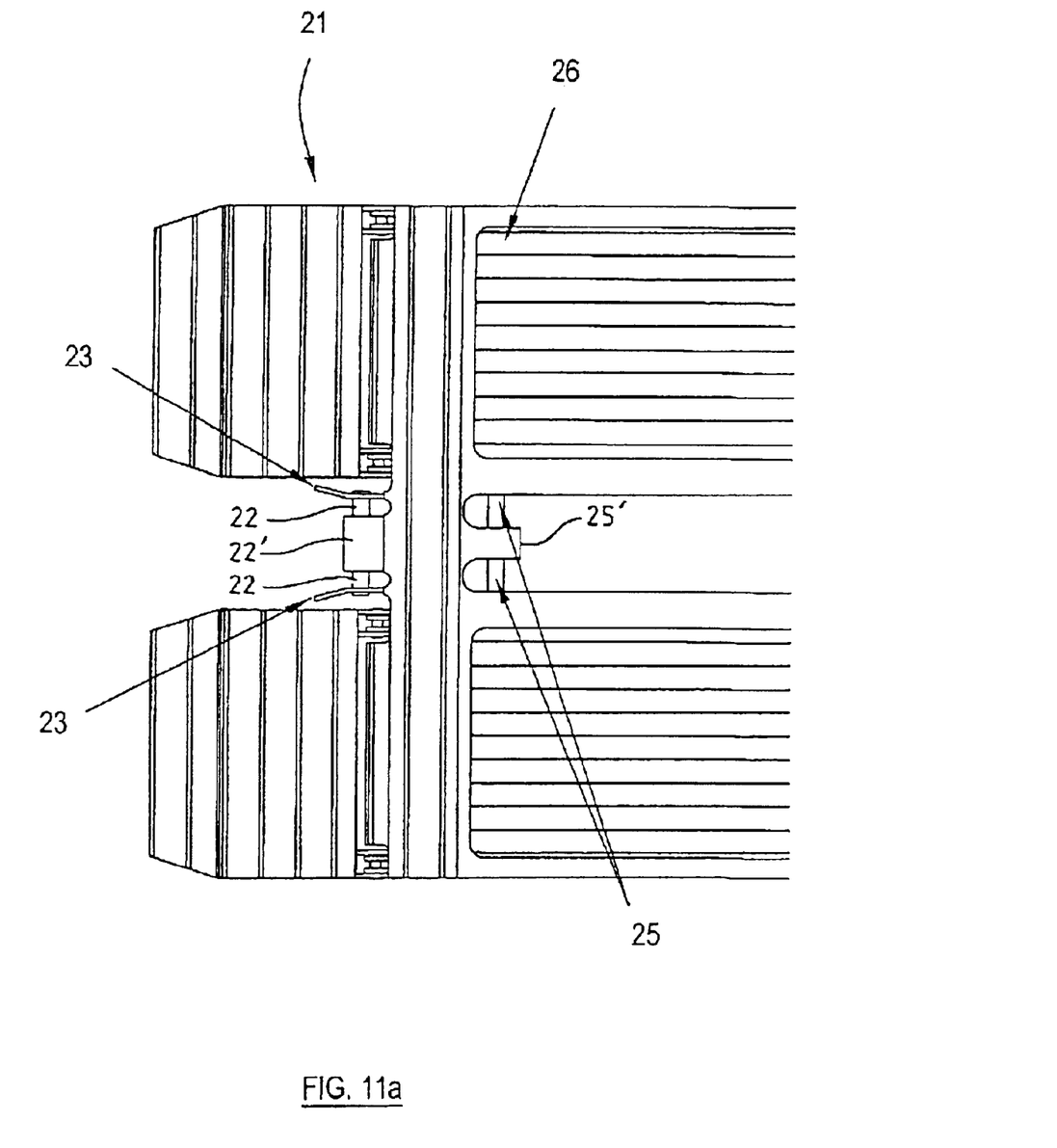
FIG. 11a shows a plan view of an alternative front cross member to that shown in FIG. 11.

An alternative trailer cross member arrangement is shown in FIG. 11a. With two embodiments, longer single pins 23 and 25 are used instead of the pairs of co-axially aligned pairs 22 and 25 shown in FIG. 11. Central supports 22' and 25' are provided to support pins 22 and 25 at their centres. In other embodiments of the invention, these central support portions may not be necessary.

Figure 12:
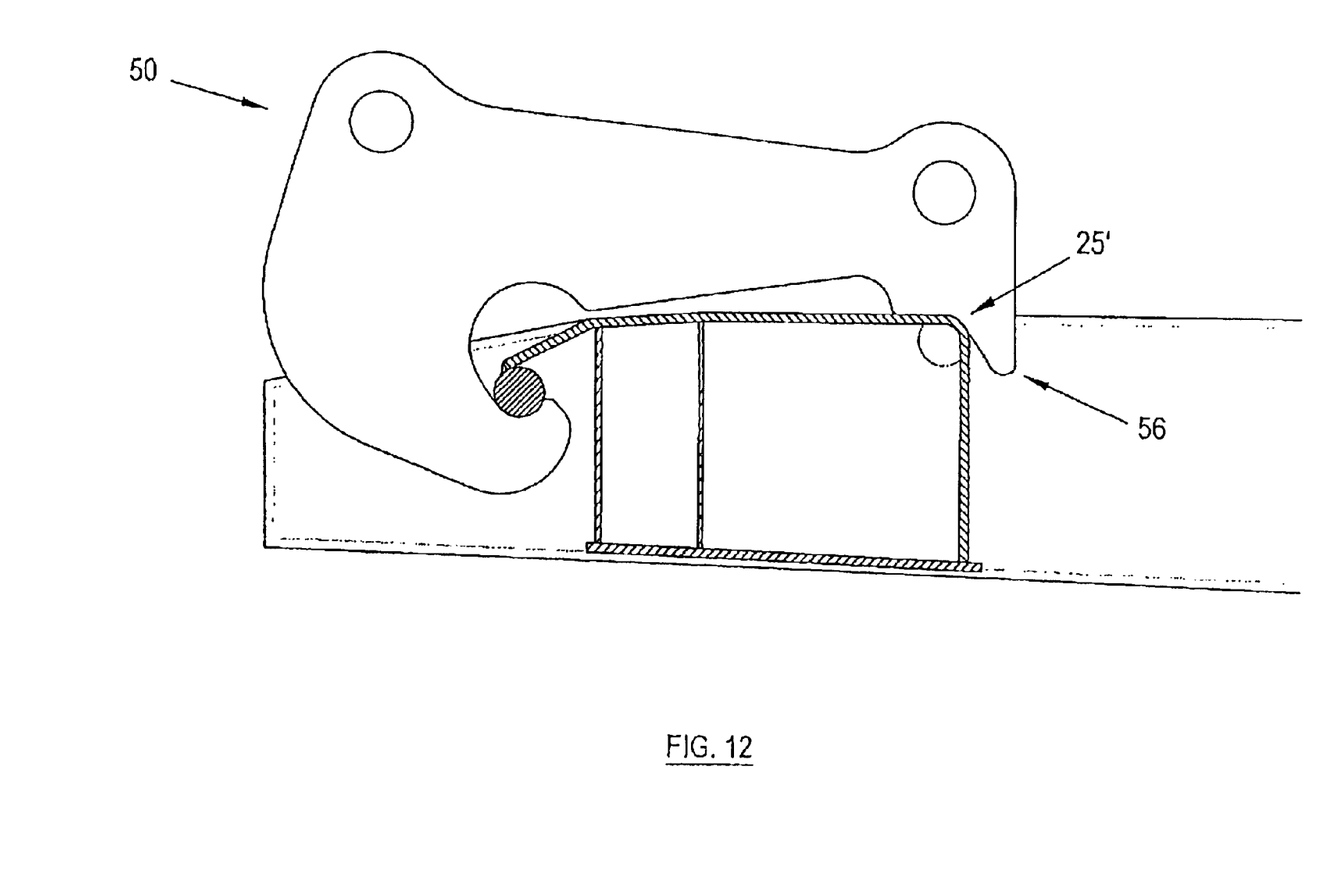
FIG. 12 shows a part sectional view of an alternative latching arrangement.

An alternative latch and bearing surface arrangement is shown in FIG. 12 in which the second coupling 25' is in the form of an upper planar surface having a radiused edge.

Figure 5:
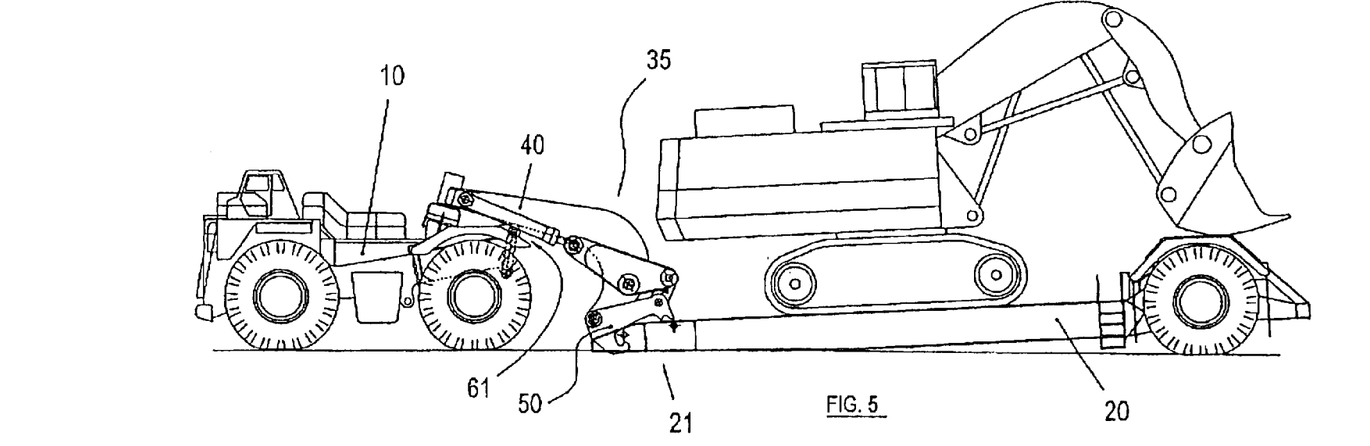
FIGS. 5, 6, 7, 8 and 9 show the hitch assembly shown in FIGS. 1 and 2 attached to a tow vehicle and connecting to and then raising the end of the trailer.

The operation of the hitch assembly 30 will now be described with reference to FIGS. 5, 6, 7, 8 and 9. The excavator vehicle (or any other vehicle) to be transported is first driven on to the trailer 20 while its front end 20 is in contact with the ground as shown in FIG. 5. The gooseneck 40 and its associated components, including latches 50 as shown in FIG. 3, is at this time separate from the trailer 20 allowing easy access to the front end of the trailer 20.

Figure 6:
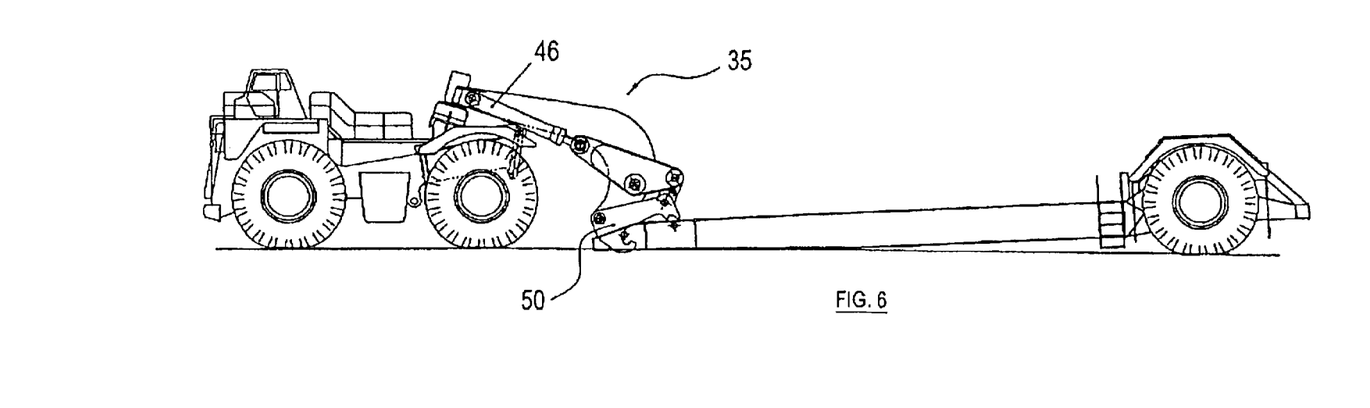
Figure 7:
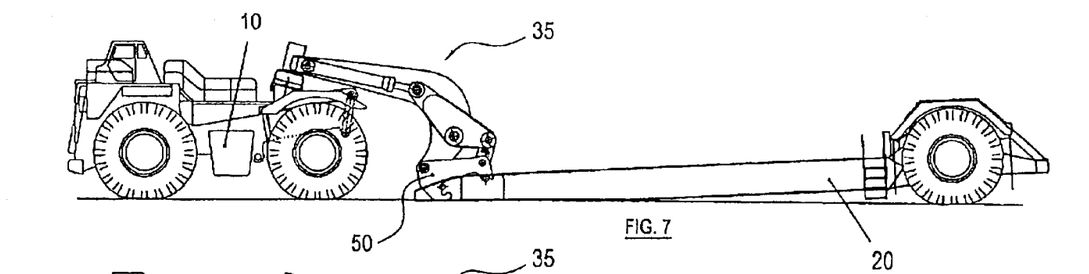
Figure 8:
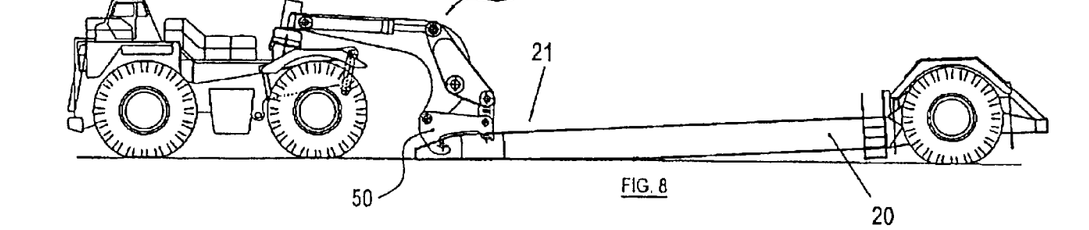

Once the vehicle to be transported is securely positioned on the trailer as shown in FIG. 5, hitching and lifting can occur. The first step is shown in FIG. 6 in which tow vehicle 10 with gooseneck 40 attached reverses toward the front end 21 of the trailer 20 until the open mouths 52 of the latches 50 engage with the first (front) coupling pins 22 (various arrangements, for instance gooseneck support assembly 61 shown in FIG. 5 may be used to keep the rear end 48 of the gooseneck assembly 35 raised off the ground prior to hooking up a trailer). Lead-in guides 23 shown in FIG. 11 assist with this process. Next the piston rods of the hydraulic rams 46 are partially extended causing the latches 50 to rotate with respect to the gooseneck frame 40 in the direction of arrow 60 shown in FIG. 4a. This rotation results in the ramped surfaces 57 of fingers 56 engaging against the second coupling pins 25 causing a relative sliding movement that pulls the mouths 52 of the latch 50 into engagement with first pins 22 and removes any initial misalignment between the gooseneck assembly 35 and the trailer front end 21. Further rotation causes the lower part 53 of mouths 52 to engage with the underside of front coupling pins 22. FIGS. 7 and 8 show this transition. Once in the position shown in FIG. 8, further rotation of latch 50 in the direction of arrow 60 causes a force couple about the front and rear coupling pins 22 and 25, the force couple raising the end 21 of the trailer 20 without relative movement between the latch 50 and the first and second coupling pins 22 and 25.

The geometry of the arrangement of the hydraulic rams 46, the lever 44, the link arm 42 and the latch 50 is such that the ratio of linear movement between the proximal and distal ends 46' and 47' of the hydraulic rams 46 to the angular movement between the latch 50 and the gooseneck frame 40 decreases between the initial and the final extension of the hydraulic rams 46. As a result, a relatively small amount of linear travel from the hydraulic rams 46 results in a significant angular movement of the latch 50 to establish a hook-up between the gooseneck assembly 35 and the front end 21 of the trailer as if shown progressively in FIGS. 6, 7 and 8. It can be further seen between FIGS. 8 and 9 that a relatively large amount of cylinder travel produces a small angular movement in the latch 50 so as to raise the front end 21 of the trailer 20.

Figure 9:
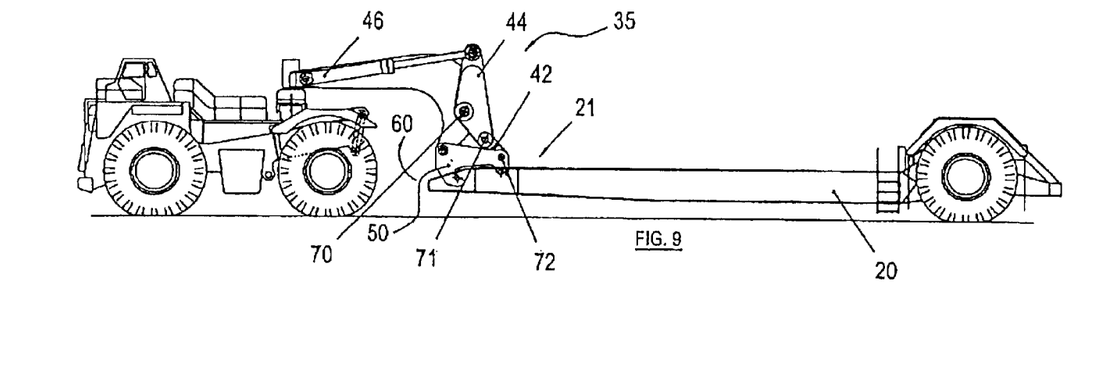

FIG. 9 shows subsequent extension of hydraulic cylinders 46 causing lifting of the front end 21 of trailer 20 to the final position suitable for towing shown in FIG. 9. The force generated during lifting by the hydraulic rams 46 is amplified by the above-described geometry of the arrangement of the hydraulic rams themselves, the levers 44, the link 42 and the latch 50.

As shown in FIG. 9, by this point, the lever has rotated through the over centre position with respect to link 42 to a position in which pivot axis 70, 71 and 72 are substantially in line so that there is very little force acting on the hydraulic cylinders 46. The over centre position provides a self-locking ability.

The geometry of the hitch assembly 30 is such that very little longitudinal horizontal movement of the trailer 20 occurs during the lifting process. That is, the wheel base or distance between the rear wheels of the tow vehicle 10 and the rear wheels of the trailer 20 does not change substantially during lifting.

The location of the hydraulic cylinders 46 on the front end and on top of the gooseneck allow for easy maintenance and assembly. Furthermore, is location enables all hydraulic connections to be located high up off the ground and near the tow vehicle 10 and away from dirt and potential impact points.

The hitch assembly of the present invention can be used with both conventionally constructed front loading trailers (as shown in FIGS. 5 to 9) and with modular front loading trailers (as shown in FIG. 10).

While the present invention has been described in terms of preferred embodiment in order to facilitate better understanding of the invention, it should be appreciated that various modifications can be made without departing from the principals of the invention. Therefore, the invention should be understood to include all such modifications within its scope.

What is claimed is:

1. A hitch assembly for connecting a front end of a low-loader trailer to a tow vehicle, the hitch assembly comprising:

a first mount located at the front end of the trailer;

a second mount longitudinally spaced towards the rear end of the trailer from the first mount;

a gooseneck frame having a front end and a rear end, the front end connectable to the tow vehicle;

a latch connectable to the front end of the trailer by pivotal engagement with both the first and second mounts, the latch pivotally connected to the rear end of the gooseneck frame and having a longitudinally extending body having a front end and a rear end, wherein the front end and the rear end of the latch are not movable relative to one another; and wherein the latch has a rearwardly opening mouth engageable with an underside of the first mount and a downwardly facing engagement means, disposed rearwardly from the mouth, engagable with an upper side of the second mount; and a means for rotating the latch with respect to the gooseneck frame, wherein, in use, the front end of the trailer is liftable by the action of a force couple imparted entirely through the latch to the first and second mounts.

2. A hitch assembly as claimed in claim 1 wherein the pivotal connection between the latch and the gooseneck frame is positioned on the gooseneck such that, in use, rotation of the latch to lift the front end of the trailer, moves the trailer forwards with respect to the rear end of the gooseneck.

3. A hitch assembly as claimed in claim 2 wherein the pivotal connection between the latch and the gooseneck frame is at the front end of the latch body.

4. A hitch assembly as claimed in claim 3 wherein the means for rotating the latch with respect to the gooseneck frame comprises:

a ram means having a proximal and a distal end, the ends movable with respect to each other and the proximal end mounted to the front end of the gooseneck frame;

a lever rotatably connected at a fulcrum to the gooseneck frame, the lever having proximal and distal ends, the proximal end pivotally connected to the distal end of the ram means; and a link arm having a proximal and a distal end, the proximal end pivotally connected to the distal end of the lever and the distal end of the link arm pivotally connected to the rear end of the latch body.

5. A hitch assembly as claimed in claim 4 wherein, in use, the ratio of linear movement between the proximal and distal ends of the ram means to the angular movement between the latch and the gooseneck frame decreases between the initial extension and the final extension of the ram means.

6. A hitch assembly as claimed in claim 5 wherein the lever fulcrum, the pivotal connection between the link arm and the lever and the pivotal connection between the link arm and the latch are substantially in line when the front of the trailer is fully lifted by the latch.

7. A hitch assembly as claimed in claim 1 wherein the latch further comprises a ramped surface extending rearwards and downwards from the downwardly facing engagement means, wherein, upon initial rotation of the latch, the ramped surface slides with respect to the second mount so as to pull the latch into locking engagement with both the first and second mounts.

8. A hitch assembly as claimed in claim 7 wherein the latch comprises a pair of parallel laterally spaced apart side members, each side member having surfaces defining a part of the rearwardly opening mouth and a part of the downwardly facing engagement means.

9. A hitch assembly as claimed in claim 8 wherein each said part of the engagement means comprises a recess defined by the surface(s) of the side member.

10. A hitch assembly as claimed in claim 9 wherein the first mount comprises a first pin, or a first pair of co-axially aligned pins, mounted transversely to the front end of the trailer.

11. A hitch assembly as claimed in claim 10 wherein the second mount comprises a second pin, or a second pair of co-axially aligned pins, mounted transversely to the front end of the trailer.

12. A gooseneck assembly for connecting a front end of a low-loader trailer to a tow vehicle, the gooseneck assembly comprising:

a gooseneck frame having a front end and a rear end, the front end connectable to the tow vehicle;

a latch pivotally connected to the rear end of the gooseneck frame for rotation about an axis transverse to the gooseneck frame, the latch connectable to the front end of the trailer by engagement at two longitudinally spaced apart locations on the trailer, wherein the front end and the rear end of the latch are not movable relative to one another; and wherein the latch has a rearwardly opening mouth engagable with an underside of the first mount located at the front end of the trailer and a downwardly facing engagement means, disposed rearwardly from the mouth, engagable with an upperside of the second mount located at the front end of the trailer, and a means for rotating the latch with respect to the gooseneck frame, wherein, when connected to the trailer, rotation of the latch with respect to the gooseneck frame lifts the front end of the trailer by the action of a force couple imparted entirely though the latch.

13. A gooseneck assembly as claimed in claim 12 wherein the pivotal connection between the latch and the gooseneck frame is positioned on the gooseneck such that, in use, rotation of the latch to lift the front end of the trailer, moves the trailer forwards with respect to the rear end of the gooseneck.

14. A hitch assembly as claimed in claim 13 wherein the pivotal connection between the latch and the gooseneck frame is at the front end of the latch body.

15. A gooseneck assembly as claimed in claim 14 wherein the means for rotating the latch with respect to the gooseneck frame comprises:

a ram means having a proximal and a distal end, the ends movable with respect to each other and the proximal end mounted to the front end of the gooseneck frame;

a lever rotatably connected at a fulcrum to the gooseneck frame, the lever having proximal and distal ends, the proximal end pivotally connected to the distal end of the ram means; and a link arm having a proximal and a distal end, the proximal end pivotally connected to the distal end of the lever and the distal end of the link arm pivotally connected to the rear end of the latch.

16. A gooseneck assembly as claimed in claim 15, wherein, in use, the ratio of linear movement between the proximal and distal ends of the ram means to the angular movement between the latch and the gooseneck frame decreases between the initial extension and the final extension of the ram means.

17. A gooseneck assembly as claimed in claim 16 wherein the lever fulcrum, the pivotal connection between the link arm and the lever and the pivotal connection between the link arm and the latch are substantially in line when the front of the trailer is fully lifted by the latch.

18. A gooseneck assembly as claimed in claim 12 wherein the latch further comprises a ramped surface extending rearwards and downwards from the downwardly facing engagement means, and wherein, upon initial rotation of the latch, the ramped surface slides with respect to the second mount so as to pull the latch into locking engagement with both the first and second mounts.

19. A gooseneck assembly as claimed in claim 18 wherein the latch comprises a pair of parallel laterally spaced apart side members, each side member having surfaces defining a part of the rearwardly opening mouth and a part of the downwardly facing engagement means.

20. A gooseneck assembly as claimed in claim 19 wherein each said part of the engagement means comprises a recess defined by the surface(s) of the side member.

* * * * *